United States Patent [19]
Gudmundsson et al.

[11] Patent Number: 4,900,400
[45] Date of Patent: Feb. 13, 1990

[54] ARRANGEMENT FOR LIQUID TREATMENT OF PULP

[75] Inventors: Per E. W. Gudmundsson, Sörberge; Alf I. Lindström, Sundsbruk; Jan-Erik Berg, Sundsvall, all of Sweden

[73] Assignee: Sunds Defibrator Aktiebolag, Sweden

[21] Appl. No.: 249,569

[22] PCT Filed: Apr. 15, 1987

[86] PCT No.: PCT/SE87/00192
§ 371 Date: Sep. 14, 1988
§ 102(e) Date: Sep. 14, 1988

[87] PCT Pub. No.: WO87/06962
PCT Pub. Date: Nov. 19, 1987

[30] Foreign Application Priority Data
May 13, 1986 [SE] Sweden .............................. 8602150

[51] Int. Cl.⁴ .......................... D21C 9/06; B01D 33/38
[52] U.S. Cl. .................................. 162/308; 68/205 R; 162/60; 210/401; 210/406
[58] Field of Search ............... 162/60, 297, 298, 349, 162/363, 365, 308, 310, 367; 210/386, 400, 406, 401, 456, 216, 772; 68/205 R

[56] References Cited
U.S. PATENT DOCUMENTS

| | | | |
|---|---|---|---|
| 2,185,868 | 1/1940 | Schaefer | 162/349 |
| 4,569,762 | 2/1986 | Gaudfrin | 210/406 |
| 4,657,637 | 4/1987 | Lindstrom | 210/400 |

FOREIGN PATENT DOCUMENTS 2906254 8/1982 Fed. Rep. of Germany .
85/02424 6/1985 PCT Int'l Appl. .
111855 9/1944 Sweden .

Primary Examiner—Karen M. Hastings
Attorney, Agent, or Firm—Lerner, David, Littenberg, Krumholz & Mentlik

[57] ABSTRACT

Apparatus for treating a pulp suspension with a treatment liquid is disclosed, comprising a continuous pervious belt for receiving the pulp suspension and moving it through a treatment zone in a predetermined direction. A treatment liquid supply is located above the continuous belt for supplying the treatment liquid onto the pulp suspension as it travels through the treatment zone, and a collector is located below the continuous belt for receiving liquid passing through the pulp suspension. The treatment liquid supply includes a treatment liquid feed pipe for supplying a flow of the treatment liquid, a distributor for dividing the flow of treatment liquid from the treatment liquid supply into first and second flow components, the first flow component being in the direction of the moving belt and the second flow component being counter to that direction, a deflector for deflecting the second flow component into that direction, and first and second plates for applying first and second flow components onto the pulp suspension, whereby the amount of the treatment liquid supplied to the pulp suspension is controlled.

10 Claims, 2 Drawing Sheets

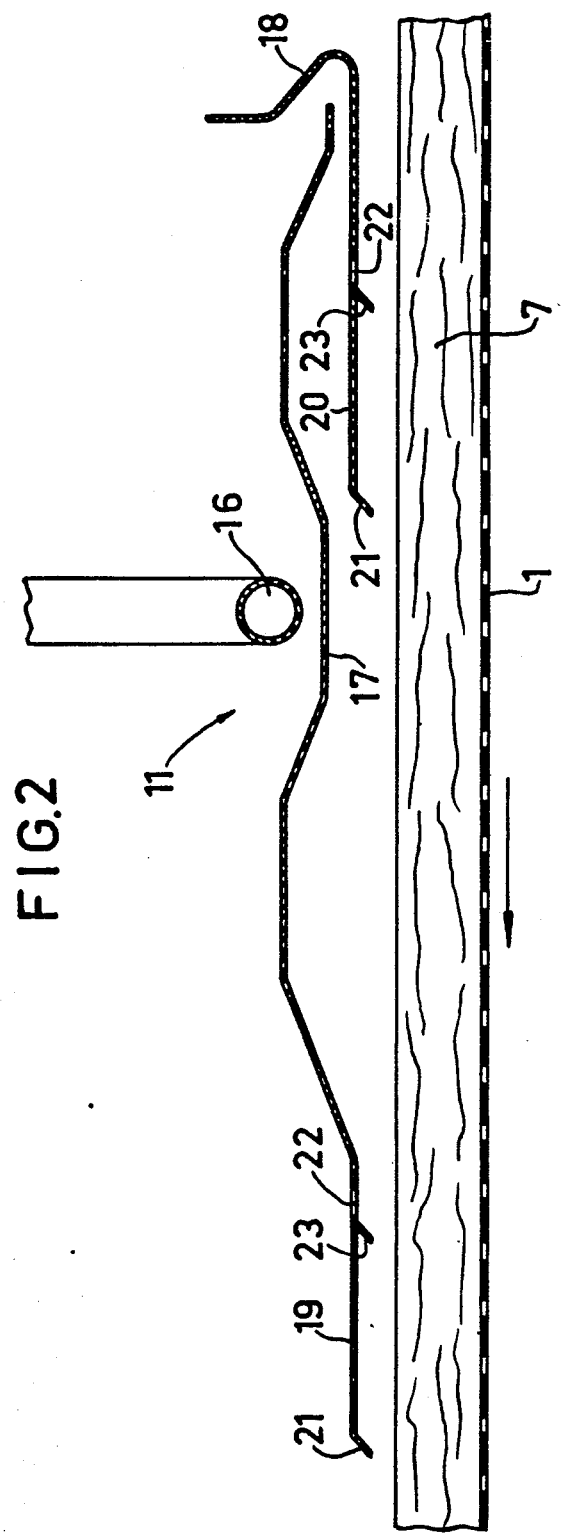

ARRANGEMENT FOR LIQUID TREATMENT OF PULP

BACKGROUND OF THE INVENTION

The present invention is directed to apparatus for treating a pulp suspension with a treatment liquid.

The supply of treatment liquid is affected by a plurality of liquid supply devices located above the belt. Each such supply device normally sprays a liquid both in the direction in which the belt is running, and in the opposite direction thereagainst. In order to make maximum use of the liquid flow, half of it is thus directed in either direction. Unfortunately, the liquid applied countercurrently has a tendency to mix with the liquid content of the pulp instead of displacing the pulp, primarily because of the large impulse against the pulp web created thereby.

The same problem may occur in connection with the concurrent application of liquid, when the flow is too great. It is desirable to apply the maximum amount of liquid with each such distribution device. However, in view of the above difficulties, the supply of treatment liquid must be restricted, thereby restricting the production therewith. A need, therefore exists for more efficient application of the treatment liquid, and an increase in the production of treated liquid pulp.

SUMMARY OF THE INVENTION

In accordance with the present invention, one embodiment addresses these needs by providing an apparatus for treating the pulp suspension with a treatment liquid comprising a continuous liquid pervious belt for receiving the pulp suspension and moving the pulp suspension through a treatment zone in a predetermined direction. The treatment liquid supply means is located above the continuous belt in the treatment zone for supplying treatment liquid onto the pulp suspension as it travels through the treatment zone, and collection means are located below the continuous belt for receiving liquid passing through the pulp suspension. The treatment liquid supply means comprises a treatment liquid feed pipe for supplying a flow of the treatment liquid and distribution means for dividing that flow of treatment liquid into first and second flow components. The first flow component is disposed in the predetermined direction in which the belt is travelling, and the second flow component is disposed counter to that predetermined direction. Deflecting means are supplied for deflecting the second flow component into that predetermined direction, along with application means comprising first and second plate members for applying the first and second flow components onto the pulp suspension respectively, whereby the amount of the treatment liquid supplied to the pulp suspension is controlled.

In accordance with one embodiment of the present invention, the distribution means which are substantially symmetrical to the feed pipe. Preferably, the treatment liquid supply means extends across the entire width of the belt.

In accordance with another embodiment of the present invention, each of the first and second plate members includes at least one gap for supply of at least a portion of the first and second flow components therethrough. Preferably, first and second plate members are provided, including guide lip means associated with each of said at least one gap associated therewith. More preferably, guide lip means are also provided, located at the downstream edge of said at least one gap.

In accordance with another embodiment of the present invention, guide lip means are provided obliquely disposed with respect to said first and second plate members. Preferably, each of the first and second plate members includes end guide lip means at the ends of the plate members, and more preferably, the end guide lip means are obliquely disposed with respect to the first and second plate members.

BRIEF DESCRIPTION OF THE DRAWINGS

FIG. 2 is a cross-sectional view of the apparatus shown in FIG. 1.

DETAILED DESCRIPTION OF THE PREFERRED EMBODIMENTS

Figure 1:
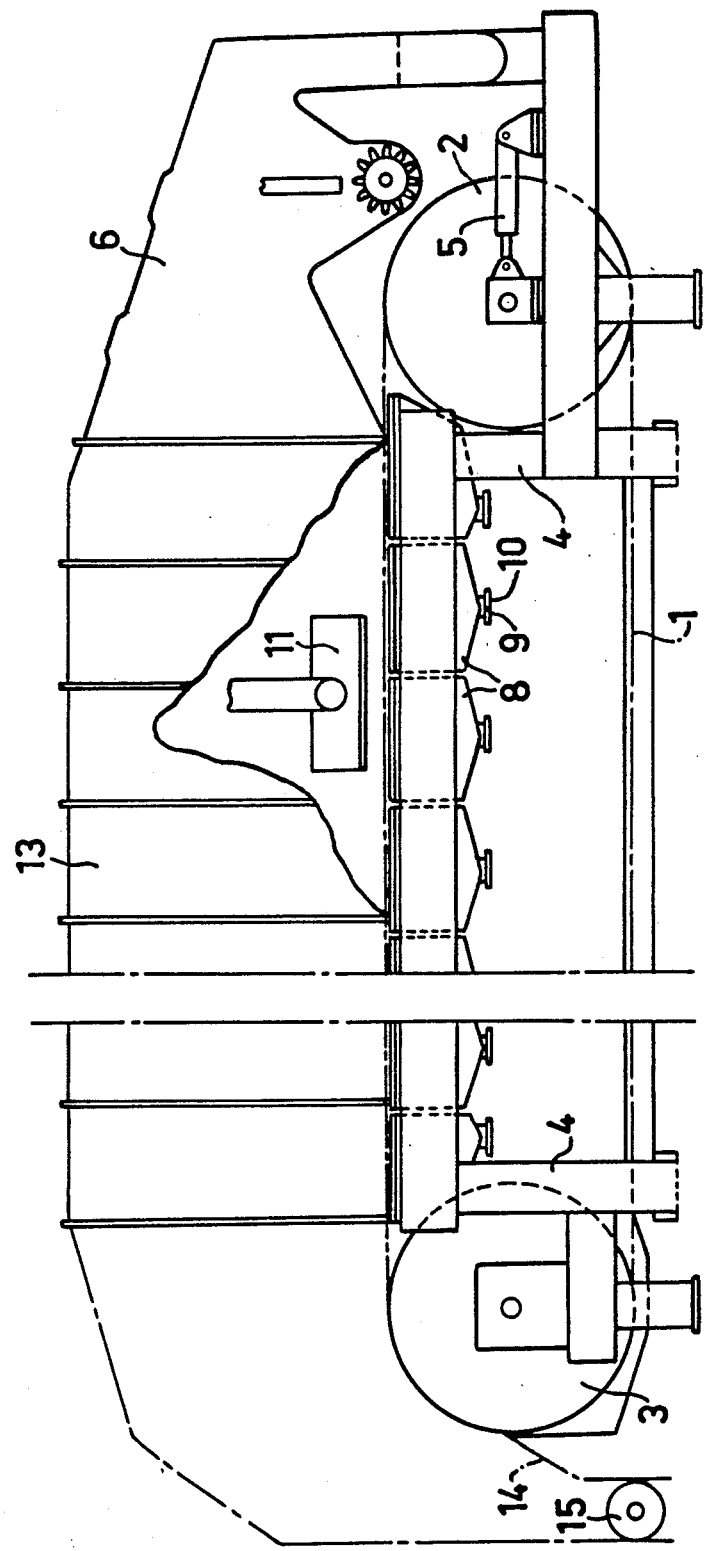
FIG. 1 is a side elevational view of an apparatus in accordance with the present invention.

The nature of the present invention can be more fully appreciated and understood with reference to the following detailed description thereof, which refers to the drawings herein, and in which like numerals refer to like portions thereof.

The present apparatus for the liquid treatment of pulp as shown in FIG. 1 comprises a stand 4, with two end rolls 2 and 3, over which an endless liquid pervious belt 1, runs. The belt is a wire or a perforated belt, for example, a steel belt. The belt is driven by end roll 3, and slides over perforated covers on containers 8, located therebeneath. A head box 6, for supply of pulp is located at one end of the belt. At the other end of the belt 1, means 14 for transferring the treated pulp is provided. Devices 11, for the supply of treatment liquid to the pulp are located above the belt 1. The containers 8, located beneath are intended for collecting liquid. Both the devices for the supply of treatment liquid and the liquid receiving containers are placed in the transverse direction across the entire belt width, which amounts to 6 m, and in certain cases can still be wider.

More specifically, a continuous belt 1, runs about a first end roll 2, and second end roll 3. The rolls are arranged in a stand 4, in such a manner that the first end roll 2 is movable by means of a stretching device 5, preferably a hydraulic one, for adjusting the belt tension. The driving is effected by the second end roll 3.

At the first end roll 2, a head box 6, is located for distributing the cellulose pulp in a uniform layer 7, on the belt 1. After the head box 6, a plurality of containers 8, are arranged one after the other in the longitudinal direction of the belt 1. The containers 8, are provided with perforated covers in support of the belt 1. Outlets 9 and 10 are connected to the containers 8 for the discharge of liquid, vapors and gases. The liquid outlets 9 and 10 are located on the bottom of the containers 8 to insure effective drainage. The liquid level in the containers 8 is controlled by a special means so that a little space for the vapors and gases is maintained in the upper part of the containers 8. Thereby, the drop of the liquid from the belt 1 down into the containers is small, thereby reducing the tendency of foaming.

Above the belt, devices 11 for the supply of treatment liquid are located. A pressure difference is maintained over the pulp layer 7, in order to effect liquid transport transversely through the pulp layer. A hood 13 is provided above the belt.

At the second end roll 3, a transfer device 14 for the completely treated pulp layer is provided which device, for example, is a doctor blade. Beneath the doctor blade a conveying screw 15, is located for conveying the pulp to subsequent processing steps.

Each device 11 for the supply of treatment liquid comprises a feed pipe 16, distribution means 17, deflecting means 18, and application means in the form of a front plate 19 and a rear plate 20. The leading edge on each plate is provided with a lip 21, which is angled obliquely downwardly to the belt. Both plates 19 and 20 are provided with a gap 22. Several gaps may possibly be arranged one after the other in the plates 19 and 20. In connection with each gap 22, a guide lip 23 is located.

The treatment liquid flows through the feed pipe 16, down into the distribution means 17, which should be substantially symmetrical relative to the feed pipe 16. The liquid flow is divided by the distribution means 17 into two parts, concurrent and countercurrent to the running direction of the belt 1. The concurrent flow thereafter flows onto the front plate 19 of the application means. The countercurrent flow is first turned through 180° by the deflecting means 18 before it flows onto the rear plate 20 of the application means.

From the liquid flow to each plate 19 and 20, a portion is separated through the gaps 22, and by means of the guide lips 23 is directed obliquely down to the pulp layer 7 on the belt 1. The remaining liquid flow is also directed obliquely down the lips 21 located at the end of the plates 19 and 20.

The liquid flow passing through each supply device 11 depends on a great number of factors such as belt speed, pulp layer thickness, distance between the supply devices, pressure drop over the pulp layer, and nature of the treatment liquid, as well as the pulp. The apparatus of the present invention provides liquid flows up to 13 m³ treatment liquid per ton of treated pulp. This indicates flows of up to 10,000 liters per minute at a production of 1,000 tons of pulp per 24 hours. In certain cases, even greater flows can be applied due to the fact that the liquid, according to the invention, is applied concurrent with the direction of the moving belt, and divided into partial flows. Also, the conditions for displacing the liquid in the pulp layer are very favorable. Accordingly, both the pulp treatment efficiency and the production of treated pulp can be increased by at least 10% compared with prior art techniques.

The size of the gaps 22 may be adjusted and is preferably within the range of 10–20 mm. The lips 21 and guide lips 23 each form an obliquely downward angle with the plates 19 and 20 of the application means of about 25–45°, preferably 30–40°. The guide lips 23 are located in the downstream edge of the gaps 22 and also form an obliquely downward angle with plates 19 and 20. The distance between the plates 19 and 20 of the application means and the pulp suspension is minimized and preferably smaller than 50 mm.

From the foregoing description, one skilled in the art can easily ascertain the essential characteristics of this invention and without departing from the spirit and scope thereof can make various changes and modifications of the invention to adapt it to various usages and conditions.

We claim:

1. An apparatus for treating a pulp suspension with a treatment liquid comprising a continuous pervious belt for receiving said pulp suspension and moving said pulp suspension through a treatment zone in a predetermined direction, treatment liquid supply means located above said continuous belt in said treatment zone for supplying said treatment liquid onto said pulp suspension as it travels through said treatment zone in said predetermined direction, and collection means located below said continuous belt for receiving liquid passing through said pulp suspension on said belt, said treatment liquid supply means comprising a treatment liquid feed pipe for supplying a flow of said treatment liquid, distribution means for dividing said flow of treatment liquid from said treatment liquid supply means into first and second flow components, said first flow component being in said predetermined direction and said second flow component being counter to said predetermined direction, deflecting means for deflecting said second flow component into said predetermined direction, and application means comprising first and second plate members for applying said first and second flow components onto said pulp suspension, wherein each of said first and second plate members includes at least one gap for supply of at least a portion of said first and second flow components therethrough to control the amount of said treatment liquid supplied to said pulp suspension.

2. The apparatus for treating a pulp suspension according to claim 1 wherein said treatment liquid supply means extends across the entire width of said belt.

3. The apparatus according to claim 1 wherein said distribution means is substantially symmetrical to said feed pipe.

4. The apparatus according to claim 1 wherein each of said first and second plate members includes guide lip means associated with each of said at least one gap.

5. The apparatus according to claim 4 wherein each of said guide lipmeans is located at an edge of said at least one gap which is downstream with respect to said predetermined direction.

6. The apparatus according to claim 5 wherein each of said guide lip means is obliquely disposed with respect to said first and second plate members.

7. The apparatus according to claim 1 wherein each of said first and second plate members includes end guide lip means at the ends of said plate members.

8. The apparatus according to claim 7 wherein each of said end guide lip means is obliquely disposed with respect to said first and second plate members.

9. The apparatus according to claim 6 wherein said guide lip means form an angle from about 25° to 45° with respect to said first and second plate members.

10. The apparatus according to claim 8 wherein said end guide lip means forms an angle of from about 25° to 45° with respect to said first and second plate members.

* * * * *